US012711708B2

(12) United States Patent
Ghazvinian Zanjani et al.

(10) Patent No.: US 12,711,708 B2
(45) Date of Patent: Aug. 18, 2026

(54) WIREFRAME GENERATION VIA GAUSSIAN SPLATTING

(71) Applicant: QUALCOMM Incorporated, San Diego, CA (US)

(72) Inventors: Farhad Ghazvinian Zanjani, Almere (NL); Hong Cai, San Diego, CA (US); Robert Peter Viehauser, Bad Hofgastein (AT); Markus Eder, Salzburg (AT); Fatih Murat Porikli, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 244 days.

(21) Appl. No.: 18/747,857

(22) Filed: Jun. 19, 2024

(65) Prior Publication Data

US 2025/0391110 A1 Dec. 25, 2025

(51) Int. Cl.

| | |
|---|---|
| ***G06T 17/20*** | (2006.01) |
| ***G06T 5/70*** | (2024.01) |
| ***G06T 7/13*** | (2017.01) |
| ***G06T 7/70*** | (2017.01) |

(52) U.S. Cl.

CPC ................ *G06T 17/20* (2013.01); *G06T 5/70* (2024.01); *G06T 7/13* (2017.01); *G06T 7/70* (2017.01); *G06T 2210/56* (2013.01)

(58) Field of Classification Search

CPC .... G06T 5/70; G06T 7/13; G06T 7/70; G06T 17/20; G06T 2210/56

See application file for complete search history.

(56) References Cited

U.S. PATENT DOCUMENTS

| | | | | |
|---|---|---|---|---|
| 2023/0237728 A1* | 7/2023 | Wang | ...................... | G06T 19/20 345/426 |
| 2024/0265630 A1* | 8/2024 | Vianello | ................ | G06F 30/23 |
| 2025/0336154 A1* | 10/2025 | Zhang | ..................... | G06T 17/20 |

OTHER PUBLICATIONS

Jiang et al., "3DGS-ReLoc: 3D Gaussian Splatting for Map Representation and Visual ReLocalization", arXiv:2403.11367, Mar. 17, 2024, pp. 1-8. (Year: 2024).*

Gai Z., et al., "EGRA-NeRF: Edge-Guided Ray Allocation for Neural Radiance Fields", Image and Vision Computing, vol. 134, Apr. 14, 2023, pp. 1-9, XP093275025, Guildford, GB, abstract, section 3.

(Continued)

*Primary Examiner* — Ping Y Hsieh
*Assistant Examiner* — Jose M Torres
(74) *Attorney, Agent, or Firm* — Patterson + Sheridan LLP

(57) ABSTRACT

Certain aspects of the present disclosure provide techniques and apparatus for improved three-dimensional reconstruction using machine learning. In an example method, an image depicting an object is accessed, and an edge map comprising a plurality of edges is generated based on the image. A thickness of each of the plurality of edges in the edge map is modified based on a current stage of the three-dimensional reconstruction. A rendered image depicting a set of Gaussian distributions in a three-dimensional virtual space is generated using Gaussian splatting. One or more parameters of one or more of the set of Gaussian distributions are modified based on comparing the rendered image and the edge map, and after modifying the one or more parameters, a three-dimensional wireframe model of the object is generated based on the set of Gaussian distributions.

20 Claims, 8 Drawing Sheets

(56) References Cited

OTHER PUBLICATIONS

Gong Y., "EGGS: Edge Guided Gaussian Splatting for Radiance Fields", arXiv: 2404.09105v1 [cs.CV], Apr. 14, 2024, 1-5, XP091728307, 5 Pages, abstract, section 2.
International Search Report and Written Opinion—PCT/US2025/032901—ISA/EPO—Oct. 10, 2025.
Liu R., et al., "AtomGS: Atomizing Gaussian Splatting for High-Fidelity Radiance Field", arXiv:2405.12369v1, May 20, 2024, XP091762691, pp. 1-18, abstract, section 4.
Kerbl B., et al., "3D Gaussian Splatting for Real-Time Radiance Field Rendering," SIGGRAPH, ACM Trans, Graph., vol. 42, No. 4, Article 1, Aug. 8, 2023, pp. 1-14.
Liu R., et al., "Zero-1-to-3: Zero-Shot One Image to 3D Object," Novel View Synthesis, 2023, pp. 1-4.
Liu Y., et al., "PC2WF: 3D Wireframe Reconstruction from Raw Point Clouds," Published as a Conference Paper at ICLR, 2021, pp. 1-12.
Tang J., et al., "Make-It-3D: High-Fidelity 3D Creation from A Single Image with Diffusion Prior," arXiv:2303.14184v2, Apr. 3, 2023, 17 Pages.
Xie S., et al., "Holistically-Nested Edge Detection," ICCV, arXiv:1504.06375v2, Oct. 4, 2015, pp. 1-10.
Xue N., et al., "Volumetric Wireframe Parsing from Neural Attraction Fields," arXiv:2307.10206v1, Jul. 14, 2023, 14 Pages.
Ye Y., et al., "NEF: Neural Edge Fields for 3D Parametric Curve Reconstruction from Multi-view Images," arXiv:2303.07653v2, Mar. 16, 2023, 13 Pages.

* cited by examiner

WIREFRAME GENERATION VIA GAUSSIAN SPLATTING

Aspects of the present disclosure relate to wireframe reconstruction using images depicting objects.

Three-dimensional (3D) wireframe models of physical objects can be used in a wide variety of applications, such as pose estimation of the physical objects, tracking, localization, and the like. Some conventional systems that perform various tasks rely on 3D models (e.g., computer-aided design (CAD) models) as the object template or reference, where these 3D models are manually created by users using 3D modeling software. For example, the 3D CAD model may be aligned to the object as depicted in an image in order to determine the pose of the object (e.g., the orientation, position, and the like) of the object. However, the creation of these 3D models is time intensive, and relies on the expertise of a user who has substantial experience with 3D modeling. Without such models, conventional solutions may be unable to operate (e.g., to perform pose estimation for physical objects). Moreover, as such approaches rely on manually created models, these systems generally only work for a relatively small set of predefined objects for which models are available, and cannot perform the relevant tasks for novel objects (e.g., objects for which a 3D model does not yet exist).

BRIEF SUMMARY

Certain aspects of the present disclosure provide a processor-implemented method, comprising: accessing an image depicting an object; generating an edge map comprising a plurality of edges based on the image; modifying a thickness of each of the plurality of edges in the edge map based on a current stage of the three-dimensional reconstruction; generating a rendered image depicting a set of Gaussian distributions in a three-dimensional virtual space using Gaussian splatting; modifying one or more parameters of one or more of the set of Gaussian distributions based on comparing the rendered image and the edge map; and after modifying the one or more parameters, generating a three-dimensional wireframe model of the object based on the set of Gaussian distributions.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
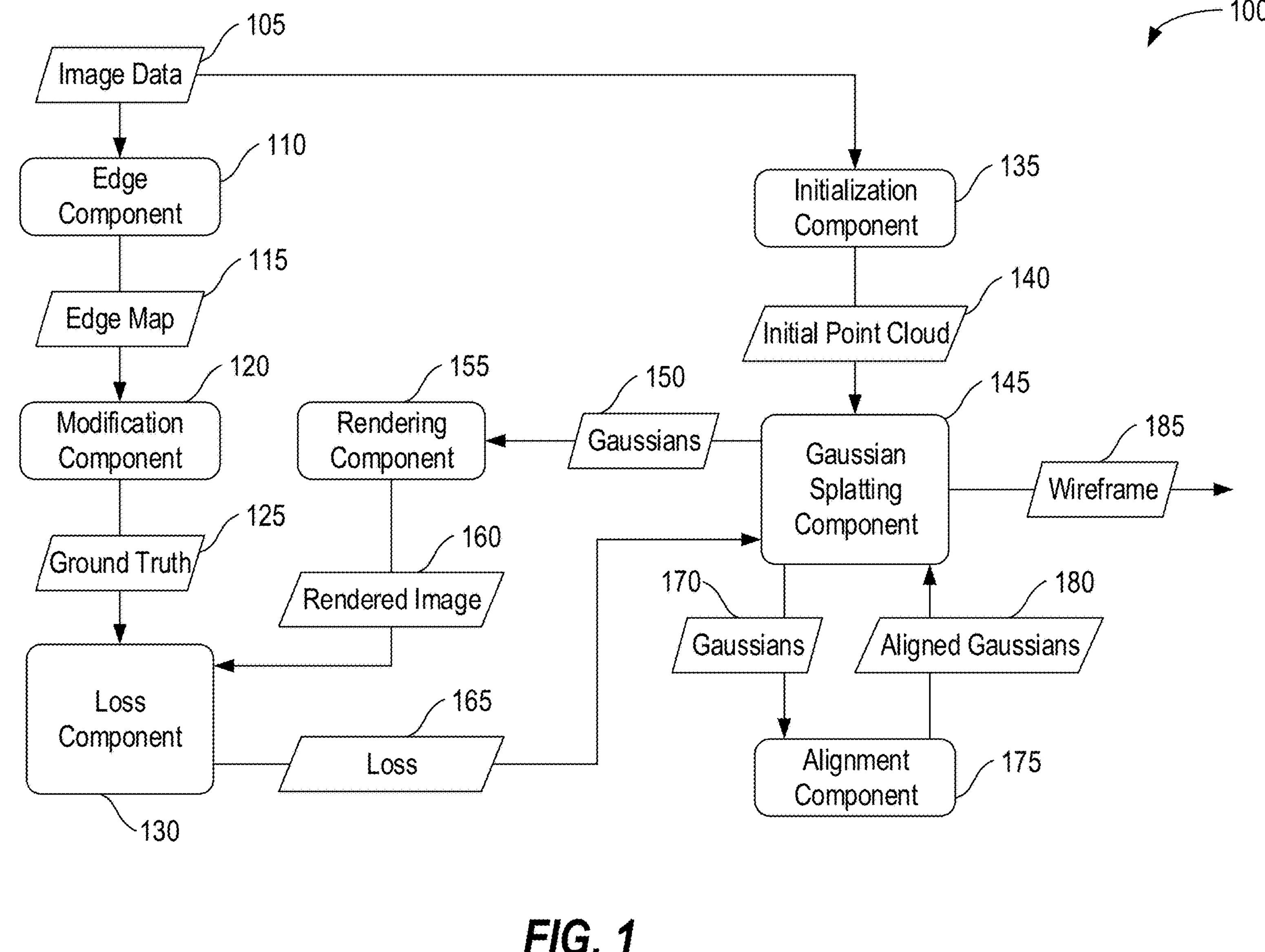
FIG. 1 depicts an example workflow for wireframe generation using Gaussian splatting, according to some aspects of the present disclosure.

Aspects of the present disclosure provide apparatuses, methods, processing systems, and non-transitory computer-readable mediums for 3D wireframe generation using Gaussian splatting machine learning models.

In some aspects of the present disclosure, 3D wireframe models may be generated by processing a set of image(s) depicting objects using an iterative Gaussian splatting approach that aligns Gaussian distributions along the edges of the object. That is, using some aspects of the present disclosure, the edges of the object may be represented as thin wires in three-dimensional space, where the wires consist of a set of points (e.g., Gaussian distributions along the edge. In some aspects, these points may be joined to form a continuous wireframe model, as discussed in more detail below. In some aspects, the Gaussian distributions used to form the edges of the model encode not only the position of the edge, but also the directionality of the edge, as discussed in more detail below. This directionality information can substantially improve downstream operations.

In some aspects, as discussed in more detail below, a wireframe model can be constructed over the course of an optimization process, where the parameters of a set of 3D Gaussian distributions (referred to in some aspects simply as "Gaussians") are adapted to minimize (or at least reduce) one or more loss terms. That is, machine learning can be used to learn optimal (or at least improved) parameters for the Gaussians that result in an accurate wireframe model. In some aspects, the objective function used to refine the Gaussians corresponds to increasing the likelihood of rendering two-dimensional (2D) images, depicting the Gaussians field, that match or align with edge maps of training images.

In some aspects, a set of 2D training images are used to generate the wireframe, where the training images depict the object(s) or location(s) of interest (e.g., the thing(s) for which a wireframe model is desired). In some aspects, a 2D edge map can be generated for each training image, where each edge map is a sparse image generated based on a training image (e.g., a red, green, and blue (RGB) image depicting the object). The edge maps may generally be generated by applying edge detection algorithms, as discussed in more detail below.

In some aspects, utilizing the obtained edge maps can introduce substantial instability during the optimization process due to the sparsity of the maps. That is, because the edges in the edge maps are generally quite thin (e.g., one pixel wide), it may be difficult or impossible for the optimization process to operate, and the 3D Gaussians may never converge to form a wireframe of the object. In some aspects, therefore, the training process may begin with thickened edge maps, where the degree of thickness may be reduced during training until the thickness reaches a defined or preferred minimum (or at least reduced) value (e.g., equal to one pixel) after a few epochs (also referred to as iterations or stages). In some aspects, the "iterations," "epochs," or "stages" of the reconstruction operation generally refer to the process of computing a loss and updating the parameters of the Gaussians, where each iteration or epoch comprises one such loss computation and parameter updating. This can allow the Gaussians to be iteratively refined to more accurate edges, substantially accelerating the wireframe generation process.

In some aspects, by aligning the Gaussians to the edge map(s) over multiple iterations, a highly accurate 3D wireframe model can be generated depicting the object(s) and/or scene. Advantageously, this process can be performed automatically using simple 2D images and does not rely on manual modeling to create the wireframe. After the wireframe is generated, the wireframe can be used to perform a wide variety of further operations, including pose estimation and/or tracking of novel objects (including six degree of freedom (6DoF) estimation, where the orientation and position of objects can be determined precisely), as well as camera localization (e.g., based on matching edges between the camera frame and the generated 3D wireframe), and a wide variety of other tasks. As used herein, "pose estimation" generally refers to the computer vision task of determining the position (e.g., location) and/or orientation of physical objects in 3D space. Similarly, "object tracking" refers to tracking the movement of physical objects in 3D space across time. Further, "localization" refers to determining or inferring the pose of a camera (e.g., the location and orientation of the camera) based on images captured by the camera. Each of these tasks (and many more) are substantially improved when accurate 3D wireframe models are available.

For example, in some aspects, camera localization and/or object pose estimation can be used to substantially improve extended reality (XR) systems, including augmented reality (AR), virtual reality (VR), and mixed reality (MR). That is, being able to accurately perform camera localization and object pose estimation for novel objects and scenes (e.g., objects and scenes for which a 3D model does not yet exist) can substantially improve the accuracy and usefulness of such XR systems.

Example Workflow for Wireframe Generation Using Gaussian Splatting

FIG. 1 depicts an example workflow 100 for wireframe generation using Gaussian splatting, according to some aspects of the present disclosure.

In some aspects, the workflow 100 is performed by a wireframe generation system. That is, the depicted components may be components of a computing system used to generate 3D wireframe models based on input image(s). Although depicted as discrete components for conceptual clarity, in some aspects, the operations performed by the various components (and others not illustrated) may be combined or distributed across any number of components. Generally, the wireframe generation system may be implemented using hardware, software, or a combination of hardware and software. In some aspects, the wireframe generation system uses machine learning to learn the values for parameters of a set of Gaussian distributions in order to construct a 3D wireframe model of (e.g., physical) objects and/or scenes.

In the illustrated example, image data 105 is accessed by an edge component 110. As used herein, "accessing" data may generally include receiving, retrieving, requesting, generating, obtaining, collecting, capturing, or otherwise gaining access to the data. For example, the edge component 110 may receive the image data 105 from a user, from a camera device, and the like. The image data 105 is generally representative of a set of one or more 2D images depicting one or more objects and/or scenes. In some aspects, at least two images depicting the object(s) and/or scene(s) from different angles or positions are included in the image data 105.

In the illustrated workflow 100, the edge component 110 processes the image data 105 using one or more edge detection techniques or algorithms to generate one or more corresponding edge maps 115. For example, in some aspects, the edge component 110 may use components such as a Canny edge detector (which uses a multi-stage algorithm to detect edges depicted in input images) to generate the edge maps 115. In some aspects, the edge component 110 may generate a respective edge map 115 for each respective image in the image data 105. As discussed above, each edge map 115 generally depicts the edge(s) detected in the images, reflecting the object(s) and/or scene(s). The edge maps 115 may be relatively sparse (e.g., with edges that are thin, such as one pixel wide), where pixels depicting edges have a first defined value (e.g., one) and pixels not corresponding to edges have a second defined value (e.g., zero).

In the illustrated example, the edge maps 115 are accessed by a modification component 120 to generate a set of ground truth(s) 125. In some aspects, the modification component 120 may generate a respective ground truth 125 for each respective edge map 115. As discussed above, in some aspects, using sparse edge maps with thin edges may cause the optimization process to fail to converge, as there may be insufficient supervision to accurately update the Gaussian parameters. In some aspects, therefore, the modification component 120 may thicken the edge(s) in each edge map 115 in order to provide additional supervision. In some aspects, the thickness of the edge(s) may be iteratively reduced during the optimization process (e.g., beginning with relatively thick edges and using slightly thinner edges at subsequent iterations until the edges reach a desired thickness, such as a pixel width of one).

Generally, a variety of operations and techniques may be used by the modification component 120 to generate the ground truth(s) 125. In some aspects, the modification component 120 may use a distance transform operation to compute a distance field for each edge map 115, where the distance field indicates, for each respective pixel in the edge map 115, the distance between the respective pixel and the closest pixel having a value of "one" (or another defined value used to indicate edges in the edge map 115). In this way, pixels near to the edge(s) are assigned relatively low values, while pixels far from the edge(s) are assigned relatively high values.

In some aspects, the modification component 120 can then binarize the distance field (e.g., the set of distance values) based on a threshold value, where the threshold controls the thickness of the edges in the ground truth 125. For example, the modification component 120 may set pixels having a distance value greater than the threshold to a value of zero, and set pixels having a distance value less than or equal to the threshold to a value of one. Larger thresholds will result in thicker edges, while smaller thresholds result in thinner edges. Equivalently, in some aspects, the modification component 120 may binarize the distance field of the inverse of the edge map 115 (such that pixels near the edge have high values, and pixels far from the edge have low values).

In some aspects, the thickness used by the modification component 120 may be adjusted during the optimization process (e.g., as a hyperparameter of the model). For example, the modification component 120 may use a first defined thickness (e.g., a first threshold) at the first iteration, and may subsequently reduce this threshold during subsequent iterations until a desired minimum (or at least reduced) thickness is reached (e.g., until the edge map 115 itself is used as the ground truth 125).

As another example, to thicken the edges, the modification component 120 may apply a Gaussian blur operation to the edge maps 115. For example, the modification component 120 may implement Gaussian blurring by convolving a relatively large 2D Gaussian kernel (e.g., eleven by eleven pixels) with the edge map 115 to produce, for each pixel, a value normalized to between zero and one. In some aspects, the bandwidth (e.g., the standard deviation or sigma, or the width) of the kernel may be variable and controlled during training to control the coarseness or thickness of the edges. For example, as discussed above, the modification component 120 may produce relatively thicker edges at the beginning of training (e.g., using relatively larger values of sigma), proceeding towards relatively more fine edges at the end (e.g., using smaller values of sigma), based on the bandwidth value (which may be a hyperparameter).

In the illustrated example, the ground truths 125 can be used by a loss component 130 to generate losses 165, as discussed in more detail below. In this way, the edge component 110 and modification component 120 can be used to provide ground truth data during training of the Gaussian parameters to guide the optimization process (e.g., the process of generating the wireframe model).

Turning now to the process of generating and optimizing Gaussian distributions based on this supervision, the Gaussian splatting component 145 may be used to iteratively modify the parameters of a set of Gaussian distributions to align the Gaussians with the ground truth 125. In the illustrated, example, an initialization component 135 may be used to generate an initial point cloud 140 based on the image data 105. Although the illustrated example depicts use of the image data 105 to generate the initial point cloud 140, in some aspects, the ground truths 125 may be used to generate the initial point cloud 140, as discussed in more detail below.

In some aspects, the initialization component 135 may randomly initialize the point cloud. However, such random distribution may substantially impact model convergence, relying on significantly more iterations to achieve an accurate wireframe model (if one can ever be generated). In the illustrated workflow 100, therefore, the initialization component 135 uses the input image data 105 to initialize the point cloud. As used herein, the "point cloud" generally refers to a set of points in 3D space, where each point is represented by a Gaussian distribution. In some aspects, each Gaussian distribution is parameterized according to a set of parameters such as color (e.g., grayscale values between zero and one), transparency, scale (e.g., the scale in three dimensions, such as in the horizontal dimension, depth dimension, and vertical dimension), orientation (e.g., defined using four parameters as a quaternion vector with four elements), and/or position (e.g., the x, y, and z coordinates of the center of the distribution). As discussed below in more detail, these parameters may be modified or refined during the optimization process (also referred to as the training process) to generate the 3D wireframe model.

In some aspects, the initialization component 135 can generate a dense point cloud with points near the object edges only, which significantly accelerates the training process. In some aspects, to initialize the point cloud, the initialization component 135 can back-project 2D edge points into the 3D volume, accumulate intersected voxels, and generate an occupancy grid by thresholding.

In some aspects, the initialization component 135 may determine the overlapped 3D field of view (FoV) across the images in the image data 105 (e.g., the region that is visible or within the FoV of all (or at least a defined portion of) the images). For example, the initialization component 135 may inspect the visibility of the nodes of a 3D dense grid, where 3D space that encompasses the visible nodes in a majority of images (e.g. above 80% of cameras) can be used as the 3D FoV of the scene.

In some aspects, a 3D volume which fills the determined 3D FoV with a defined voxel size is generated. That is, the 3D FoV is filled with voxels of a defined size. Given the camera poses (e.g., positions or angles of the images) and the intrinsic parameter(s) of the cameras or images, the pixels belonging to the edges in the training images can be back projected into this 3D volume. By computing the number of times each voxel has been occupied or intersected during back projection, the initialization component 135 can determine which voxel(s) should be used for sampling the initial point cloud. For example, in some aspects, the initialization component 135 finds the set of occupied voxels and randomly distributes points (e.g., Gaussian distributions) inside occupied voxels to generate the initial point cloud 140.

As illustrated, the Gaussian splatting component 145 can use this initial point cloud 140 as the starting point for generating the wireframe 185. Specifically, in the illustrated example, the set of Gaussians 150 (e.g., the initial Gaussians in the initial point cloud 140) are accessed by a rendering component 155, which generates one or more rendered images 160 depicting the Gaussians 150. In some aspects, the rendering component 155 generates images from the perspectives of the original images in the image data 105 (e.g., from the estimated pose of the camera when each training image was captured). Generally, each rendered image 160 is a 2D image depicting the Gaussians 150.

The loss component 130 computes the loss 165 based on comparing the rendered image(s) 160 and the ground truth(s) 125. Generally, the particular loss terms used may vary depending on the particular implementation. In some aspects, for example, the loss component 130 computes the mean absolute error (MAE) (also referred to in some aspects as L1 loss), a structural similarity index (SSIM) loss, and the like. By seeking to minimize (or at least reduce) these losses (e.g., by updating parameters of the Gaussians to minimize these losses), the Gaussians may iteratively be aligned with the edges reflected in the ground truths 125, thereby effectively reconstructing a wireframe of the object(s).

As illustrated, the loss 165 is accessed by the Gaussian splatting component 145 to update the Gaussian parameters, as discussed above. For example, as discussed above, the Gaussian splatting component 145 may update parameters such as the scale(s) of each Gaussian, the location(s) and/or orientation(s) of each Gaussian, the color and/or opacity of each Gaussian, and the like.

In some aspects, to facilitate wireframe reconstruction, the Gaussian splatting component 145 may constrain the scale of the Gaussian distributions to be elongated along a given (e.g., primary) axis. For example, the scale parameter of each Gaussian distribution may be defined to force one element of the scale parameter to be substantially larger than the other two, such as by enforcing that the scale parameter s should be defined as [a, a, f(a)] for any values of learnable parameter a, where f(a)>>a (e.g., f(a) is substantially larger than a). For example, in some aspects, $f(a)=e^{a}$. These elongated Gaussians can thereby effectively represent the directionality of the edges in the wireframe, as, during training, the Gaussian splatting component 145 will rotate and orient the elongated Gaussians along the edge to minimize (or at least reduce) the loss 165.

In some aspects, the binary pixel values in the ground truth 125 can be modeled by spherical harmonics. That is, unlike some Gaussian splatting methods, some aspects of the present disclosure can use a single channel to represent the grayscale intensity of each Gaussian distribution when generating the rendered image 160. This value may be obtained by applying various activation functions such as a leaky rectified linear unit (LeakyReLU) on the average of the red, green, and blue (RGB) values represented by the spherical harmonics of the Gaussians. This can simplify and improve the resulting wireframe.

As illustrated in the workflow 100, the Gaussian splatting component 145 may then output an updated set of Gaussians 150 (e.g., with parameters updated based on the loss 165). This process may be repeated for any number of iterations, where the Gaussian splatting component 145 updates the Gaussians 150, the loss component 130 generates a new loss 165, and the Gaussian splatting component 145 updates the Gaussians 150 again based on the new loss. In this way, the Gaussians 150 iteratively transform to align with the edges reflected in the ground truth 125, thereby generating a wireframe 185.

In some aspects, an alignment operation may be periodically applied to the Gaussians 150 (e.g., every N iterations) to update the center positions of the Gaussians 150 to force the Gaussians to locate on the same local 3D axis, as discussed in more detail below. Such an alignment operation may be useful to improve the wireframe, as the supervision provided by the loss component 130 may be insufficient to render an accurate wireframe. For example, the loss component 130 may cause the Gaussians to be close to the edges, but not precisely on the edges, due to the fact that the supervision is not applied directly to each Gaussian. Instead, the supervision is applied to multiple Gaussians along the ray that is projected through the scene to render the rendered images 160. In this way, the resulting Gaussians may have some blending and may approximate, but not precisely match, the edge. Periodically using an alignment operation may improve the accuracy of the wireframe.

For example, in the illustrated aspect, the Gaussians 170 (which may be the same as the Gaussians 150) are periodically provided to an alignment component 175, which generates aligned Gaussians 180. In some aspects, as discussed below in more detail, the alignment component 175 may, for each respective Gaussian in the set of Gaussians 170, find a set of one or more nearest neighbor Gaussians in 3D space (e.g., using a K-nearest-neighbor (KNN) graph with a value of K defined as a hyperparameter, such as a value of seven). In some aspects, the value of K may affect the strength of the alignment operation, where smaller values may result in less alignment (or slower alignment, relying on additional iterations) and larger values may result in stronger alignment (which may cause corners in the wireframe to become rounded or eliminated).

The alignment component 175 may then compute a local covariance matrix for the respective Gaussian based on the nearest neighbors. In some aspects, the covariance matrix is generated after normalizing the neighbors to have a mean location of zero (relative to the respective Gaussian). The alignment component 175 may then determine the principal axis of the set of nearest neighbors based on this covariance matrix. For example, the alignment component 175 may apply singular value decomposition (SVD) to the covariance matrix to find the principal axis (e.g., the first eigenvector). This principal axis generally reflects the principal orientation of the set of nearest neighbors, which should generally align with the edge itself. The alignment component 175 may therefore project or move the respective Gaussian distribution (along with each Gaussian in the set of nearest neighbors, in some aspects) to the principal axis in 3D space, updating the center positions of each. This forces the Gaussians to align themselves in 3D space along the edge, resulting in substantially improved wireframe accuracy.

The aligned Gaussians 180 generally correspond to the Gaussians 170 with the center positions updated by the alignment component 175. The Gaussian splatting component 145 can then proceed (either updating the aligned Gaussians 180 based on a loss 165, or providing the aligned Gaussians 180 to the rendering component 155 to generate a new loss 165).

By performing these operations, as discussed above, the Gaussians are iteratively aligned to the edges of the object(s) in the training images. In the illustrated example, when one or more termination criteria are met (e.g., after a defined number of iterations have been applied), the Gaussian splatting component 145 outputs a wireframe 185. The wireframe 185 is generally a 3D model reflecting the edge(s) of the object(s) or scene(s) depicted in the image data 105, as discussed above.

In some aspects, the output of the Gaussian splatting component 145 is a 3D point cloud of Gaussians, representing the centers of the 3D Gaussian primitives aligned with 3D edges of the object(s), as discussed above. In some aspects, the model further outputs the directionality or orientation of the 3D edges, which may be encoded in the major axis of the elongated Gaussians as discussed above. That is, the wireframe 185 may reflect edge orientations for each edge in the wireframe 185 based on the principal, primary, or elongated axis of each Gaussian, as discussed above (where the edge orientation corresponds to the principal axes). In some aspects, the edge orientation is determined based on the elongation of the Gaussians themselves. In some aspects, the alignment operation may be performed on the final set of Gaussians to determine the principal axis of each set of nearest neighbors, and these principal axes may be used as the edge orientations.

In some aspects, as the set of 3D points are each locally aligned along the edges, and the edge directions are reflected in the primary or principal axes, a post-processing stage can be used to connect the neighboring points together and create a wireframe model with continuous edges (rather than a set of elongated distributions that form the edge). That is, the Gaussians may be represented as points (rather than distributions), and edges may be added to connect neighboring points (e.g., connecting each point to its two nearest neighbor points). The edges may further be labeled or otherwise associated with edge orientation information, as discussed above.

This wireframe 185 can then be used for a wide variety of tasks, as discussed above. For example, the wireframe 185 may be used to facilitate or perform edge matching, object and/or camera pose estimation, motion tracking, and the like. Advantageously, using the workflow 100, the wireframe generation system is able to automatically generate accurate 3D wireframes 185 based on 2D images of novel objects, allowing significantly expanded and improved computer vision tasks.

Figure 2:
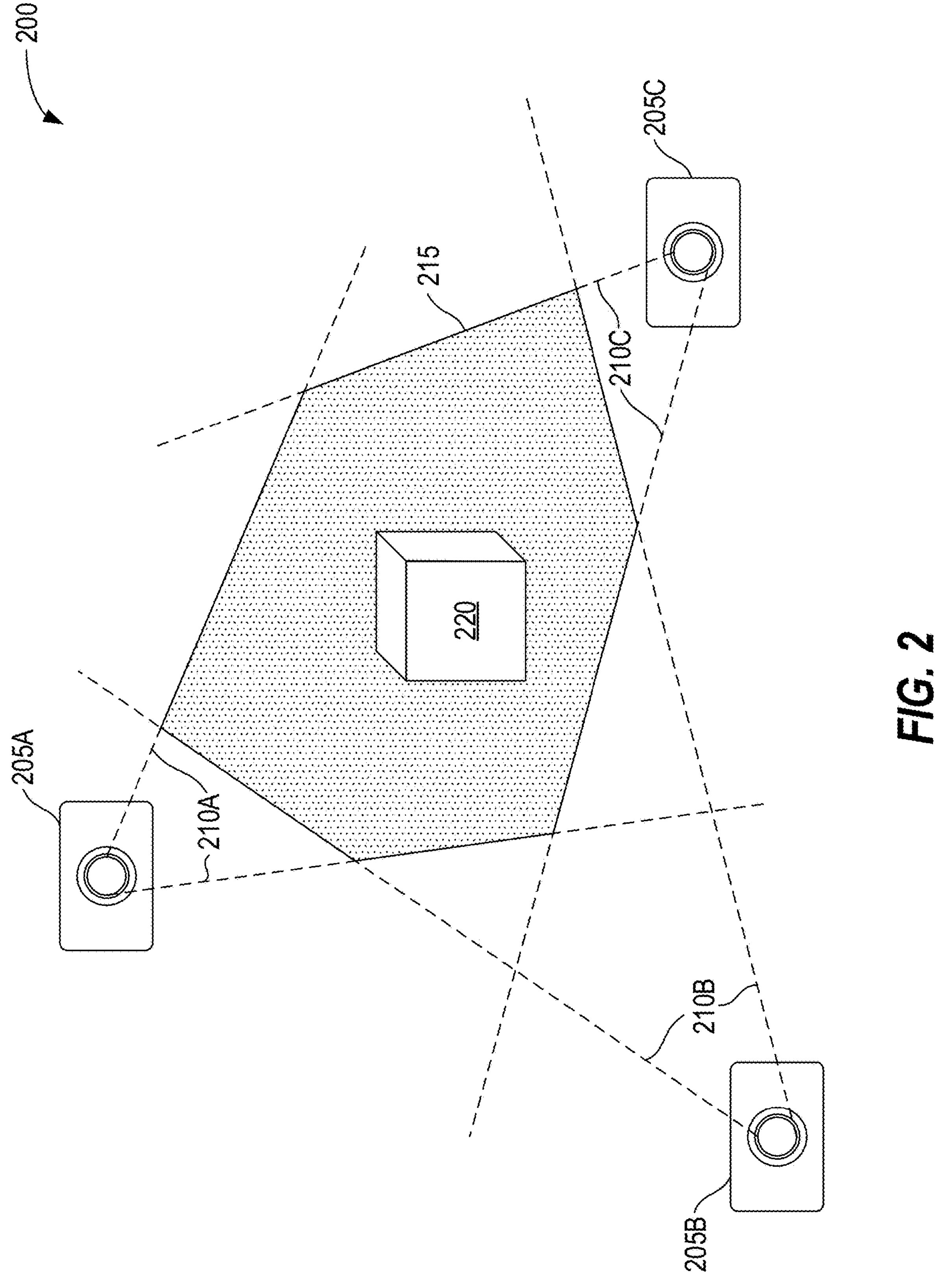
FIG. 2 depicts an example process to initialize a Gaussian splatting operation for wireframe generation, according to some aspects of the present disclosure.

Example Process to Initialize a Gaussian Splatting Operation for Wireframe Generation FIG. 2 depicts an example process 200 to initialize a Gaussian splatting operation for wireframe generation, according to some aspects of the present disclosure. In some aspects, the process 200 is performed by a wireframe generation system, such as the wireframe generation system discussed above with reference to FIG. 1. In some aspects, the process 200 provides additional detail for the initialization process discussed above with reference to the initialization component 135 of FIG. 1.

In the illustrated example, images (e.g., image data 105 of FIG. 1) depicting an object 220 can be captured by one or more cameras 205A-C from different poses or perspectives in the scene (e.g., from different sides of the object 220). In some aspects, the images used to initialize the Gaussians may be referred to as initialization images or edge maps. That is, the images captured by the cameras 205 may be processed as discussed above to generate edge maps (e.g., the edge maps 115 of FIG. 1) and/or thickened edge maps (e.g., the ground truths 125 of FIG. 1), and these edge maps may be used as initialization edge maps to initialize the Gaussians. In some aspects, the initialization images or edge maps may be the same images used during the workflow 100 to generate the wireframe. That is, the initialization images and the training images may be the same set of images.

In some aspects, the wireframe generation system may evaluate the images (or edge maps) to find the overlapping 3D FoV that is visible across each image, such as by inspecting the visibility of the nodes of a 3D dense grid. In the illustrated example, the FoV of each camera 205 or image is depicted by sight lines 210A-C. Specifically, the image(s) captured by the camera 205A have a FoV reflected by the sight lines 210A, the image(s) captured by the camera 205B have a FoV reflected by the sight lines 210B, and the image(s) captured by the camera 205C have a FoV reflected by the sight lines 210C. Although three cameras 205 or poses are depicted for conceptual clarity, the wireframe generation system may generally use any number of poses or images.

In the illustrated example, the area 215 corresponds to the determined overlapping space (e.g., the 3D volume that is visible in all, or at least a defined number or percentage of, the initialization images). In the illustrated process 200, the wireframe generation system can then generate a set of 3D voxels (using a predefined voxel size, which may be a hyperparameter) to fill the area 215. The wireframe generation system can then back project edges reflected in the initialization images (e.g., depicted in the initialization edge maps) into the 3D virtual space. That is, the pixels in the initialization edge maps may be back projected into the space (e.g., into the area 215). The wireframe generation system may track the number of times each voxel in the area 215 is intersected or occupied during this back projection (e.g., for each voxel, the number of pixels that, when back projected, intersected the voxel).

In some aspects, the wireframe generation system can then select a set of voxels based on the intersections of the back projected rays, and initialize the Gaussians within this set of voxels. For example, the wireframe generation system identify the initialization set of voxels as the voxels that were intersected at least once, the voxels that were intersected a threshold number of times within the voxels having the highest M % of intersections (e.g., the voxels that were intersected the most), and the like. In some aspects, the wireframe generation system may randomly distribute points within the identified set of voxels, where each point represents the center of a Gaussian distribution in the initialization set.

By using the process 200 to initialize the Gaussian distributions, rather than using a random initialization or other approach, the initial set may already be fairly close to the wireframe goal. This can substantially reduce the number of optimization iterations used to generate the wireframe, resulting in substantially reduced computational resource consumption, reduced heat generation, reduced generation latency, and the like.

Example Process for Gaussian Alignment for Wireframe Generation

Figure 3:
FIG. 3 depicts an example process for Gaussian alignment for wireframe generation, according to some aspects of the present disclosure.
Figure 3:
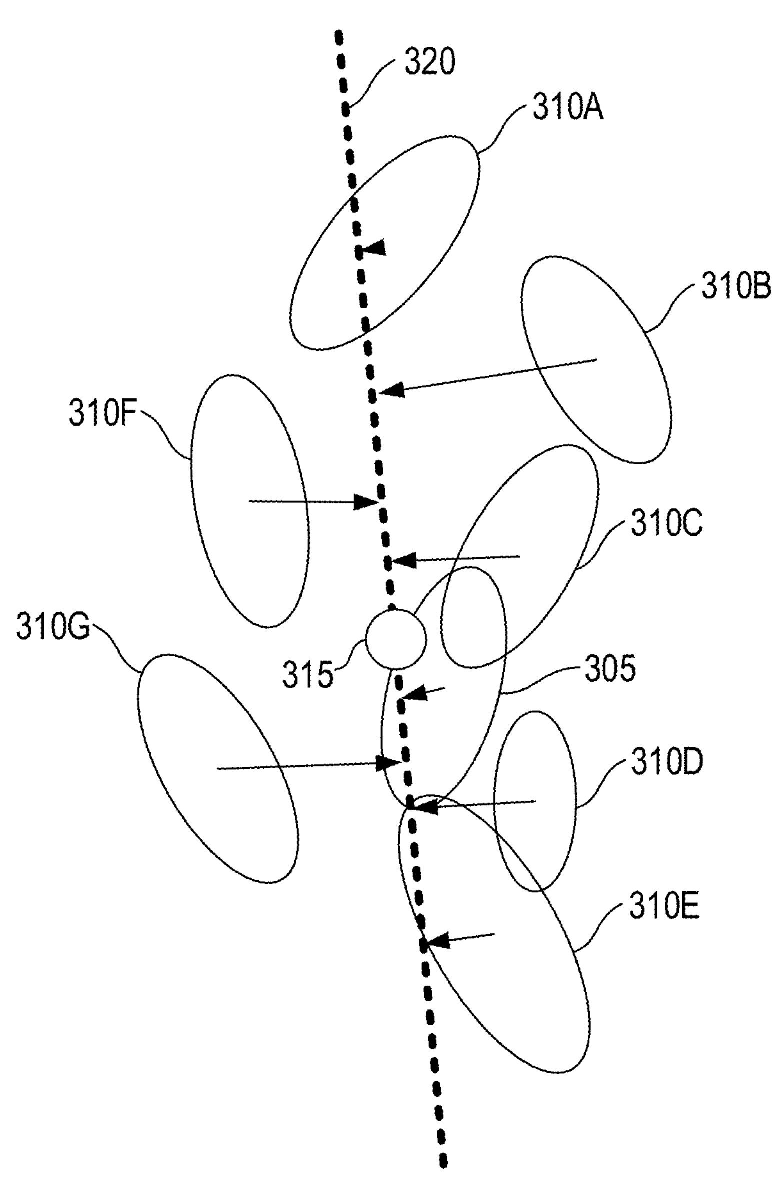

FIG. 3 depicts an example process 300 for Gaussian alignment for wireframe generation, according to some aspects of the present disclosure. In some aspects, the process 300 is performed by a wireframe generation system, such as the wireframe generation system discussed above with reference to FIGS. 1-2. In some aspects, the process 300 provides additional detail for the alignment process discussed above with reference to the alignment component 175 of FIG. 1.

The illustrated process 300 is performed with respect to a target Gaussian distribution 305. In some aspects, the process 300 may be performed separately for each Gaussian in the set of Gaussians. In the illustrated example, the wireframe generation system may identify a set nearest neighbors (e.g., using a KNN approach with a defined value for K). In the illustrated example, a value of K=7 is used to identify the seven nearest neighbor Gaussians 310A-E.

The wireframe generation system may then find the point 315 corresponding to the mean of the centers of the Gaussians (e.g., including the center of the target Gaussian distribution 305 and the centers of each nearest neighbor Gaussians 310). In the illustrated example, after normalizing the centers of the Gaussians to have a mean of zero, the wireframe generation system can compute the local covariance matrix for the target Gaussian 305 and the set of neighbor Gaussians with respect to that mean point 315.

The wireframe generation system may then use techniques such as SVD to process the covariance matrix to identify the principal axis of the set of Gaussians (including the target Gaussian 305 and the set of neighbor Gaussians 310). In the illustrated example, the principal axis is depicted as dotted line 320. The principal axis is generally representative of the orientation of the set of Gaussians in 3D space. As discussed above, using the iterative training operations to modify the Gaussian parameters (including location and orientation), this principal axis may generally correspond to or be close to the edge orientation in the training images.

As illustrated by arrows from the center of each Gaussian to the principal axis, the wireframe generation system may then move or project each Gaussian (including the target Gaussian 305 and each neighbor Gaussian 310) to the principal axis. That is, the wireframe generation system may move the Gaussian centers to the principal axis, causing the locations of these Gaussians to be aligned along this axis in 3D space.

By using this alignment process periodically for each Gaussian in the space, this alignment process can substantially accelerate the Gaussian optimization process (e.g., resulting in fewer optimization iterations used to generate the wireframe). Further, the alignment process can enable generation of substantially improved wireframes, as compared to performing the optimization without such alignments.

Example Method for Wireframe Generation Using Gaussian Splatting

Figure 4:
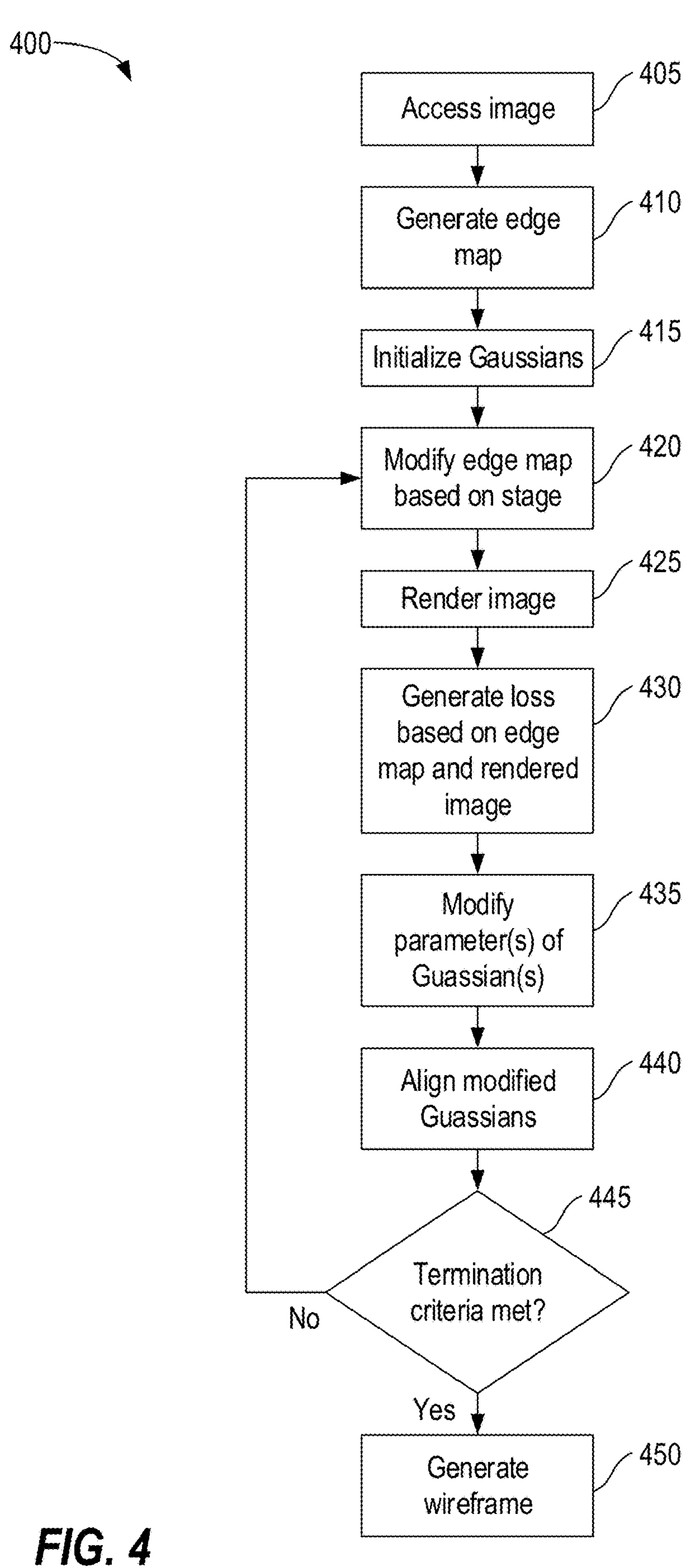
FIG. 4 is a flow diagram depicting an example method for wireframe generation using Gaussian splatting, according to some aspects of the present disclosure.

FIG. 4 is a flow diagram depicting an example method 400 for wireframe generation using Gaussian splatting, according to some aspects of the present disclosure. In some aspects, the method 400 is performed by a wireframe generation system, such as the wireframe generation system discussed above with reference to FIGS. 1-3. In some aspects, the method 400 provides additional detail for the workflow 100 of FIG. 1. In some aspects, the wireframe generation process may generally be referred to as a 3D reconstruction process or operation.

At block 405, the wireframe generation system accesses one or more images depicting one or more objects or scenes (e.g., the image data 105 of FIG. 1). As used herein, "accessing" data may generally include receiving, requesting, retrieving, obtaining, generating, capturing, or otherwise gaining access to the data. For example, the wireframe generation system may receive the image(s) from a user or other application. In some aspects, as discussed above, the image(s) may be referred to as training images and/or initialization images. In some aspects, the images generally correspond to 2D images (e.g., a 2D array of pixels) where each pixel contains one or more values (e.g., RGB values). The image(s) may generally depict one or more physical 3D objects and/or physical 3D scenes (e.g., real physical objects in physical real space). In some examples, the image(s) may include one or more generated or virtual objects and/or scenes that are not restricted to real physical configurations.

At block 410, the wireframe generation system generates a respective edge map (e.g., the edge maps 115 of FIG. 1) for each respective image accessed at block 405. The edge map(s) can be generated using a variety of techniques and operations, such as using a Canny edge detection algorithm. As discussed above, each edge map generally comprises a 2D array of pixels where the value(s) of each pixel are defined based on whether the pixel depicts an edge (e.g., of an object and/or of the scene) in the image. For example, pixels depicting edges may have a value of one, while pixels not depicted edges may have a value of zero.

At block 415, the wireframe generation system initializes a set of Gaussian distributions for a Gaussian splatting operation (e.g., using the process 200 of FIG. 2). In some aspects, the wireframe generation system randomly initializes the Gaussians in a virtual 3D space. In some aspects, the wireframe generation system uses an initialization operation to initialize the Gaussians within the volume of the object(s) and/or near edge(s) of the object(s), as discussed above. Generally, initializing the Gaussians includes selecting values for the parameter(s) of each Gaussian (e.g., randomly or based on other operations), including the scale, orientation, location, and the like. In some aspects, the wireframe generation system initializes a defined number of Gaussians (e.g., a hyperparameter). One example method for initializing the Gaussians is discussed in more detail below with reference to FIG. 5.

At block 420, the wireframe generation system modifies the edge map(s) (generated at block 410) based on the current stage of generating the wireframe model (e.g., the number of iterations that have been completed). For example, as discussed above, the wireframe generation system may thicken the edge(s) in the edge map by one amount during the first iteration, and thicken the edge(s) by progressively smaller amounts during subsequent iterations. This may assist and accelerate the optimization process, resulting in improved wireframe output with reduced computational expense. The wireframe generation system may generally use a variety of operations to thicken the edge maps, including Gaussian blurring, distance fields, and the like. In some aspects, at block 420, the wireframe generation system selects or determines the amount of thickening based on a defined mapping (e.g., a set of hyperparameters) between desired edge thickness and the stage of operations (e.g., the number of iterations that have been completed). In some aspects, the results of modifying the edge map(s) at block 420 correspond to the ground truth(s) 125 of FIG. 1.

At block 425, the wireframe generation system renders one or more images (e.g., the rendered image(s) 160 of FIG. 1) depicting the set of Gaussian distributions. In some aspects, as discussed above, the wireframe generation system may render the image from the perspective or pose of the camera(s) that captured the image(s) accessed at block 405. This may accelerate the optimization process and reduce the number of iterations used to generate the wireframe.

At block 430, the wireframe generation system generates a loss (e.g., the loss 165 of FIG. 1) based on the (modified) edge map(s) (generated at block 420) and the rendered image(s). For example, as discussed above, the wireframe generation system may compare each modified edge map with a corresponding rendered image (e.g., rendered from the same perspective) to compute one or more loss terms, such as an L1 loss, an SSIM loss, and the like.

At block 435, the wireframe generation system modifies one or more parameter(s) of one or more Gaussian distribution(s) of the set of Gaussian distributions based on the loss. As discussed above, the wireframe generation system may modify the parameter(s) in an effort to minimize (or at least reduce) the loss term(s) (e.g., such that subsequent rendered images of the Gaussians are more similar to the ground truth edge maps). As discussed above, modifying the Gaussian parameters may generally include updating values for a variety of parameters for each Gaussian, such as the scale, orientation, color, transparency, position or location of the center of the distribution, and the like.

At block 440, the wireframe generation system aligns the set of modified Gaussian distributions using one or more alignment operations (e.g., the process 300 of FIG. 3). Although the illustrated example depicts application of this alignment process each iteration (e.g., for each set of rendered images and/or after each set of loss terms are used to update the Gaussians), in some aspects, the wireframe generation system may use the alignment operation less frequently (e.g., every N-th iteration, where N may be a hyperparameter). One example method for aligning the Gaussians is discussed in more detail below with reference to FIG. 6.

At block 445, the wireframe generation system determines whether one or more termination criteria are met. Generally, the termination criteria may vary depending on the particular implementation. For example, in some aspects, the wireframe generation system may determine whether a defined number of iterations have been performed (where each iteration or stage includes executing block 420, 425, 430, and 435, as well as block 440 for at least some of the iterations or stages). For example, the wireframe generation system may use a hyperparameter to define the desired number of iterations.

As another example, in some aspects, the wireframe generation system may evaluate the quality of the current wireframe or set of Gaussians (e.g., based on the thinness of the edges as depicted in the rendered image(s), based on the average distance the Gaussians are moved during the alignment operation, based on the magnitude of the loss terms), and the like) to determine whether to terminate the operations. As yet another example, the wireframe generation system may determine whether a defined amount of time has been spent iterating, whether a defined amount of computational resources have been spent iterating, and the like.

If, at block 445, the wireframe generation system determines that the termination criteria are not met, the method 400 returns to block 420. If, at block 445, the wireframe generation system determines that the criteria are met, the method 400 continues to block 450.

At block 450, the wireframe generation system generates a 3D wireframe model based on the set of Gaussians. In some aspects, generating the wireframe may include encoding or otherwise indicating the edge orientation for each Gaussian and/or for each edge in the set. In some aspects, generating the wireframe may include connecting adjacent Gaussians (e.g., adding edges connecting the center points of neighboring Gaussians) to form the wireframe.

As discussed above, the 3D wireframe model may be used to perform a wide variety of further operations, including pose estimation and/or tracking of novel objects (including six degree of freedom estimation, where the orientation and position of objects can be determined precisely), camera localization (e.g., based on matching edges between the camera frame and the generated 3D wireframe), and a wide variety of other tasks. For example, in some aspects, camera localization and/or object pose estimation can be used to substantially improve XR systems because camera localization and object pose estimation for novel objects and scenes may be performed with substantially improved accuracy.

Figure 5:
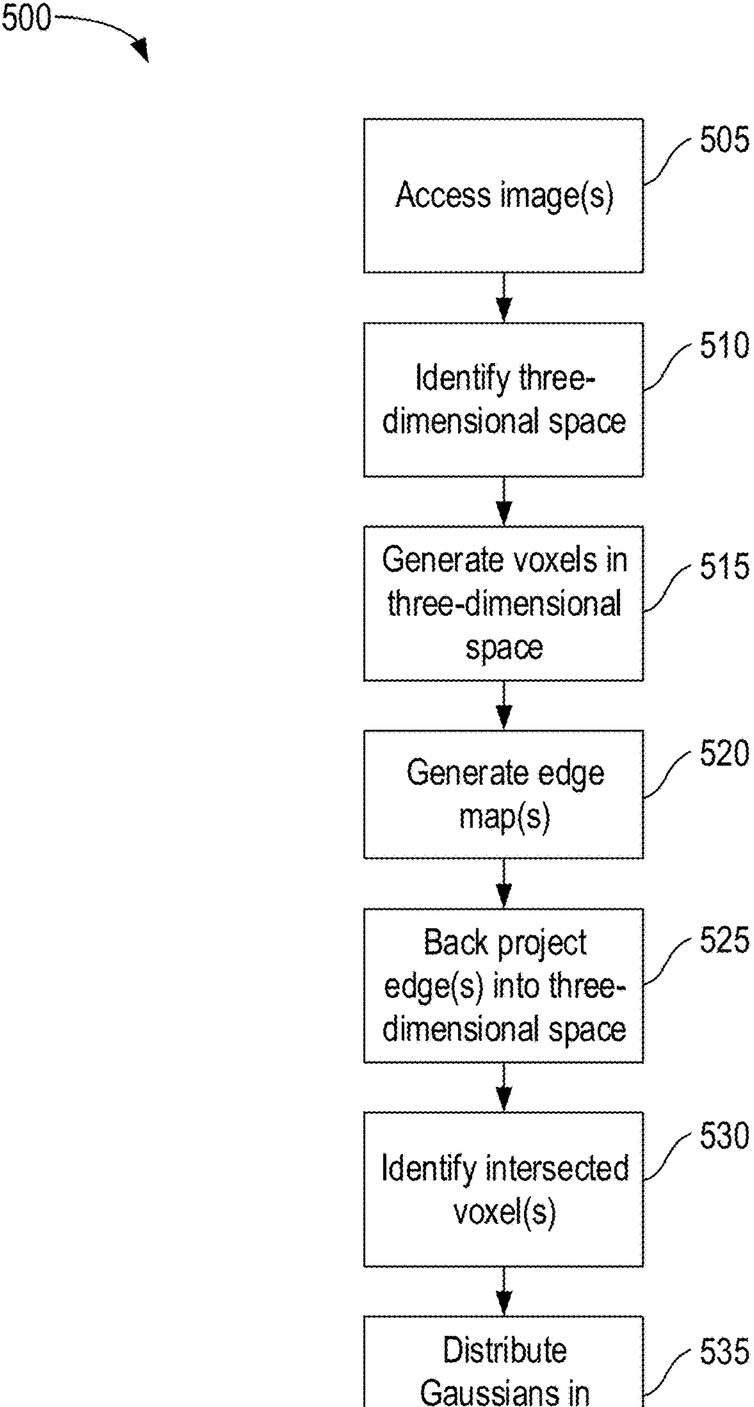
FIG. 5 is a flow diagram depicting an example method for initializing Gaussian distributions for wireframe generation, according to some aspects of the present disclosure.

Example Method for Initializing Gaussian Distributions for Wireframe Generation FIG. 5 is a flow diagram depicting an example method 500 for initializing Gaussian distributions for wireframe generation, according to some aspects of the present disclosure. In some aspects, the method 500 is performed by a wireframe generation system, such as the wireframe generation system discussed above with reference to FIGS. 1-4. In some aspects, the method 500 provides additional detail for the process 200 of FIG. 2 and/or for block 415 of FIG. 4.

At block 505, the wireframe generation system accesses a set of images (e.g., the image data 105 of FIG. 1). In some aspects, as discussed above, the image(s) may be the same as the training images accessed at block 405 of FIG. 4. The images (which may be referred to as initialization images in some aspects) generally depict one or more real object(s) or scene(s) in a real world space.

At block 510, the wireframe generation system identifies the relevant 3D space (e.g., the area 215 of FIG. 2) depicted in the images. For example, as discussed above, the wireframe generation system may identify the volume that encompasses the overlap of the FoVs of the images (e.g., the 3D area that is visible in all, or at least a defined portion of, the images). In some aspects, the wireframe generation system generates or identifies a virtual 3D space corresponding to this overlap.

At block 515, the wireframe generation system generates a set of voxels within the identified 3D space. For example, as discussed above, the wireframe generation system may uniformly or randomly distribute voxels of a defined size in the space.

At block 520, the wireframe generation system generates a set of edge map(s) for the set of image(s) accessed at block 505. For example, as discussed above, the wireframe generation system may use a variety of operations such as Canny edge detection to generate the edge maps. In some aspects, at block 520, the wireframe generation system may also modify the edge maps, such as by thickening the edges as discussed above. In other aspects, the wireframe generation system may use the unmodified edge maps.

At block 525, based on the estimated or determined poses of the image(s), the wireframe generation system back projects the pixel(s) that correspond to edges into the identified 3D virtual space (e.g., generating a ray beginning at the position of the camera that captured the image and projecting through the edge pixel(s)).

At block 530, the wireframe generation system identifies a set of intersected voxel(s) (e.g., voxels that were intersected at least once during the back projection). In some aspects, the wireframe generation system identifies any voxels that were intersected at least once. In some aspects, the wireframe generation system identifies voxels that were intersected at least a threshold number of times. In some aspects, the wireframe generation system identifies the voxels that were intersected the most often (e.g., the top M % of voxels).

At block 535, the wireframe generation system distributes a set of Gaussian distributions within the identified set of intersected voxels. For example, as discussed above, the wireframe generation system may randomly generate Gaussians having center positions within the voxel(s). In some aspects, the remaining Gaussian parameters (e.g., scale, orientation, color, and the like) may also be randomly initialized for each Gaussian, or may be initialized to defined values.

As discussed above, using the method 500, the wireframe generation system can effectively jump-start the alignment process, resulting in significantly improved wireframes with substantially reduced computational expense and latency.

Example Method for Aligning Gaussian Distributions for Wireframe Generation

Figure 6:
FIG. 6 is a flow diagram depicting an example method for aligning Gaussian distributions for wireframe generation, according to some aspects of the present disclosure.
Figure 6:
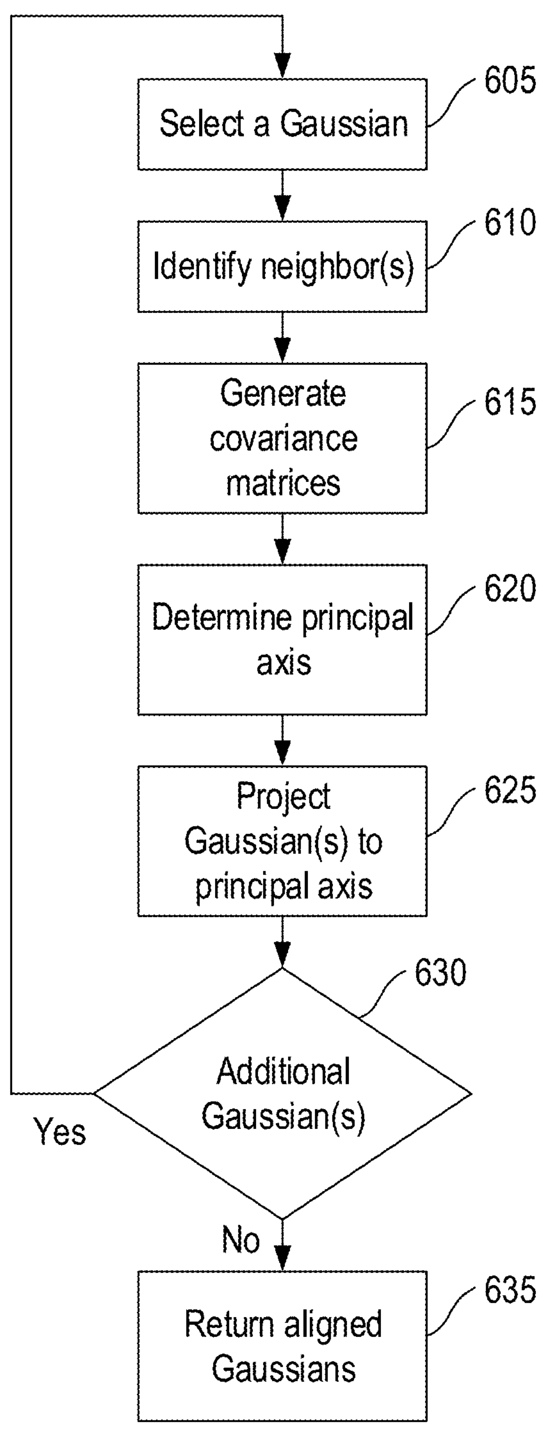

FIG. 6 is a flow diagram depicting an example method 600 for aligning Gaussian distributions for wireframe generation, according to some aspects of the present disclosure. In some aspects, the method 600 is performed by a wireframe generation system, such as the wireframe generation system discussed above with reference to FIGS. 1-5. In some aspects, the method 600 provides additional detail for the process 300 of FIG. 3 and/or for block 440 of FIG. 4.

At block 605, the wireframe generation system selects a Gaussian distribution from the set of Gaussians. Generally, the wireframe generation system may select the Gaussian using any suitable criteria, including randomly or pseudo-randomly, as the wireframe generation system will process all Gaussians during the alignment process. In some aspects, the selected Gaussian may be referred to as the target Gaussian for purposes of the method 600.

At block 610, the wireframe generation system identifies a set of nearest neighbor Gaussians (e.g., using a KNN algorithm) with respect to the selected target Gaussian.

At block 615, the wireframe generation system generates one or more covariance matrices based on the neighbor Gaussians with respect to the target Gaussian. In some aspects, as discussed above, the wireframe generation system generates a covariance matrix after normalizing the centers of each neighbor Gaussian to the mean center of the set of Gaussians. For example, for a Gaussian field with N Gaussian points, N covariance matrices of size three by three may be computed, one for each point, based on the K-nearest neighbors of each individual point. The covariance matrices (one for each point) are generally generated after zero-mean normalization of the relevant (neighbor) data points (e.g., zero-mean normalization of the 3D positions of K+1 points, including K neighbors and the target point).

At block 620, the wireframe generation system determines the principal axis of the set of Gaussians (where the set may include the set of neighbor Gaussians as well as the target Gaussian). In some aspects, as discussed above, the principal axis is determined by processing the covariance matrix using SVD to find the first eigenvector. Generally, the principal axis is a line in 3D space that passes through the mean of the Gaussian's centers and indicates the directionality or orientation of the group of Gaussians. In some aspects, the principal axis of the set of Gaussians may be used to indicate or encode the edge orientation of the edge to which the set of Gaussians correspond.

At block 625, the wireframe generation system projects the set of Gaussians (including the target Gaussian and the set of neighbor Gaussians) to the principal axis in 3D space. That is, the wireframe generation system may determine the shortest vector from the center of each Gaussian to the principal axis, and translate the Gaussian center along this vector to align the center of each Gaussian with the principal axis.

At block 630, the wireframe generation system determines whether there is at least one additional Gaussian distribution that has not yet been processed using the alignment operation. If so, the method 600 returns to block 605. If, at block 605, the wireframe generation system determines that all Gaussians have been aligned, the method 600 continues to block 635, where the wireframe generation system returns the aligned set of Gaussians (e.g., the aligned Gaussians 180 of FIG. 1). As discussed above, by periodically using the method 600, the wireframe generation system can substantially improve the fineness and accuracy of the 3D wireframe while further reducing the number of iterations and the computational expense consumed to generate the wireframe.

Example Method for Generating Three-Dimensional Wireframe Models

Figure 7:
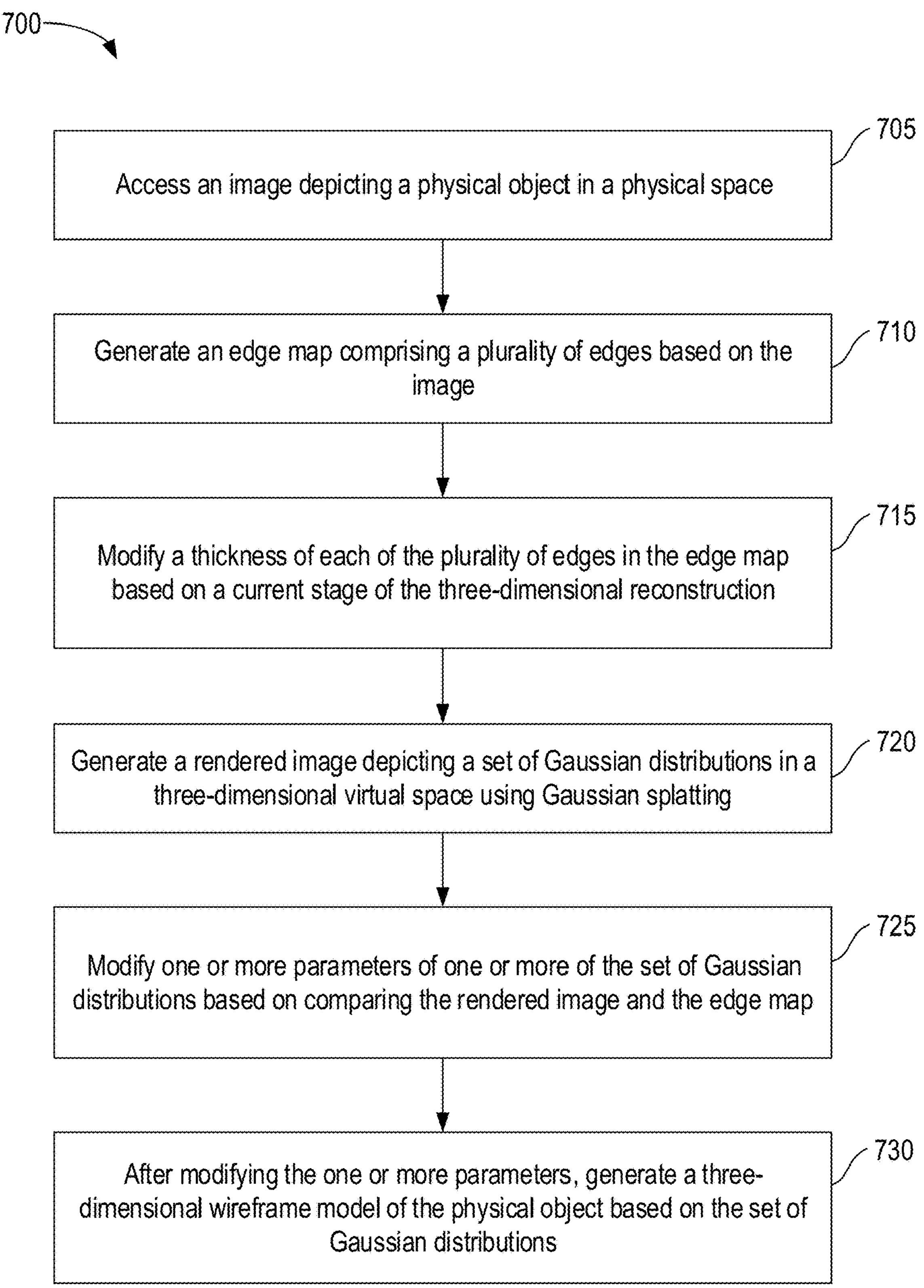
FIG. 7 is a flow diagram depicting an example method for generating three-dimensional wireframe models, according to some aspects of the present disclosure.

FIG. 7 is a flow diagram depicting an example method 700 for generating three-dimensional wireframe models, according to some aspects of the present disclosure. In some aspects, the method 700 is performed by a wireframe generation system, such as the wireframe generation system discussed above with reference to FIGS. 1-6.

At block 705, an image depicting an object is accessed.

At block 710, an edge map comprising a plurality of edges is generated based on the image.

At block 715, a thickness of each of the plurality of edges in the edge map is modified based on a current stage of the three-dimensional reconstruction.

At block 720, a rendered image depicting a set of Gaussian distributions in a three-dimensional virtual space is generated using Gaussian splatting.

At block 725, one or more parameters of one or more of the set of Gaussian distributions is modified based on comparing the rendered image and the edge map.

At block 730, after modifying the one or more parameters, a three-dimensional wireframe model of the object is generated based on the set of Gaussian distributions.

In some aspects, modifying the thickness of each of the plurality of edges based on the current stage of the three-dimensional reconstruction comprises increasing the thickness of each of the plurality of edges by a first amount, wherein the first amount is less than an amount used to increase edge thickness during a prior stage of the three-dimensional reconstruction, relative to the current stage.

In some aspects, modifying the thickness of each of the plurality of edges comprises generating a set of distance values for a set of pixels in the edge map using a distance transform and binarizing the set of distance values based on a threshold value, wherein the threshold value controls the thickness of each of the plurality of edges.

In some aspects, modifying the thickness of each of the plurality of edges comprises applying a Gaussian blur operation to the edge map.

In some aspects, the method 700 further includes initializing the set of Gaussian distributions based on a set of initialization edge maps corresponding to the object, by back projecting a set of pixels corresponding to edges in the set of initialization edge maps into the three-dimensional virtual space and initializing the set of Gaussian distributions based on the back projected set of pixels.

In some aspects, initializing the set of Gaussian distributions based on the back projected set of pixels comprises identifying a set of voxels in the three-dimensional virtual space that were intersected by the back projecting and randomly distributing the set of Gaussian distributions within the identified set of voxels.

In some aspects, the method 700 further includes aligning the set of Gaussian distributions comprising, for a first Gaussian distribution of the set of Gaussian distributions, identifying a set of nearest neighbors to the first Gaussian distribution, generating a local covariance matrix for the first Gaussian distribution based on the set of nearest neighbors, determining a principal axis of the set of nearest neighbors based on the local covariance matrix, and moving the first Gaussian distribution, in the three-dimensional virtual space, to the principal axis.

In some aspects, generating the three-dimensional wireframe model comprises determining a set of edge orientations for the three-dimensional wireframe model based on the set of Gaussian distributions.

In some aspects, determining the set of edge orientations comprises, for a first Gaussian distribution of the set of Gaussian distributions, identifying a set of nearest neighbors to the first Gaussian distribution, generating a local covariance matrix for the first Gaussian distribution based on the set of nearest neighbors, and determining a principal axis of the set of nearest neighbors based on the local covariance matrix, wherein at least one of the set of edge orientations corresponds to the principal axis.

In some aspects, determining the set of edge orientations comprises, for a first Gaussian distribution of the set of Gaussian distributions, constraining a scale of the first Gaussian distribution during the three-dimensional reconstruction to be elongated along a primary axis, wherein at least one of the set of edge orientations corresponds to the primary axis.

Example Processing System for Wireframe Generation

Figure 8:
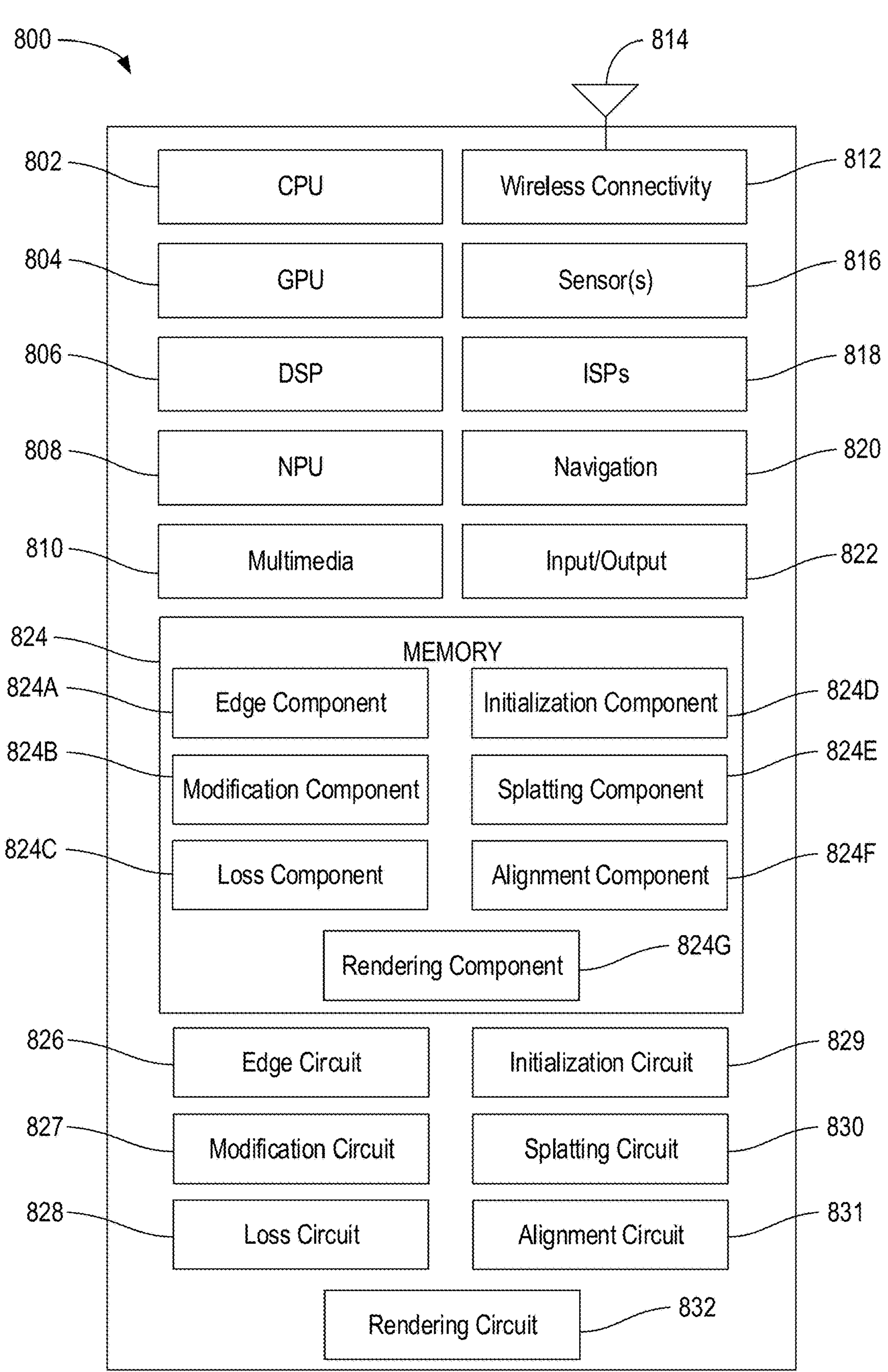
FIG. 8 depicts an example processing system configured to perform various aspects of the present disclosure.

FIG. 8 depicts an example processing system 800 configured to perform various aspects of the present disclosure, including, for example, the techniques and methods described with respect to FIGS. 1-7. In some aspects, the processing system 800 may correspond to a wireframe generation system. For example, the processing system 800 may correspond to the wireframe generation system discussed above with reference to FIGS. 1-7. Although depicted as a single system for conceptual clarity, in some aspects, as discussed above, the components described below with respect to the processing system 800 may be distributed across any number of devices or systems.

The processing system 800 includes a central processing unit (CPU) 802, which in some examples may be a multi-core CPU. Instructions executed at the CPU 802 may be loaded, for example, from a program memory associated with the CPU 802 or may be loaded from a memory partition (e.g., a partition of a memory 824).

The processing system 800 also includes additional processing components tailored to specific functions, such as a graphics processing unit (GPU) 804, a digital signal processor (DSP) 806, a neural processing unit (NPU) 808, a multimedia component 810 (e.g., a multimedia processing unit), and a wireless connectivity component 812.

An NPU, such as the NPU 808, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 808 is a part of one or more of the CPU 802, the GPU 804, and/or the DSP 806.

In some examples, the wireless connectivity component 812 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The wireless connectivity component 812 is further coupled to one or more antennas 814.

The processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

The processing system 800 may also include one or more input and/or output devices 822, such as screens, touch-sensitive surfaces (including touch-sensitive displays), physical buttons, speakers, microphones, and the like.

In some examples, one or more of the processors of the processing system 800 may be based on an ARM or RISC-V instruction set.

The processing system 800 also includes a memory 824, which is representative of one or more static and/or dynamic memories, such as a dynamic random access memory, a flash-based static memory, and the like. In this example, the memory 824 includes computer-executable components, which may be executed by one or more of the aforementioned processors of the processing system 800.

In particular, in this example, the memory 824 includes an edge component 824A, a modification component 824B, a loss component 824C, an initialization component 824D, a splatting component 824E, an alignment component 824F, and a rendering component 824G. Although not depicted in the illustrated example, the memory 824 may also include other components, such as post-processing component to join neighboring Gaussians to generate a wireframe, components to perform operations using the wireframes such as pose estimation, and the like. Though depicted as discrete components for conceptual clarity in FIG. 8, the illustrated components (and others not depicted) may be collectively or individually implemented in various aspects.

The processing system 800 further comprises an edge circuit 826, a modification circuit 827, a loss circuit 828, an initialization circuit 829, a splatting circuit 830, an alignment circuit 831, and a rendering circuit 832. The depicted circuits, and others not depicted (such as an inferencing circuit), may be configured to perform various aspects of the techniques described herein.

The edge component 824A and/or the edge circuit 826 (which may correspond to the edge component 110 of FIG. 1) may be used to generate edge maps (e.g., the edge map 115 of FIG. 1) based on input training images (e.g., the image data 105 of FIG. 1), as discussed above. For example, the edge component 824A and/or the edge circuit 826 may use a variety of edge detection techniques to generate 2D edge maps indicating the edge(s) detected in the training image(s).

The modification component 824B and/or the modification circuit 827 (which may correspond to the modification component 120 of FIG. 1) may be used to modify edge maps (e.g., to generate the ground truth 125 of FIG. 1), as discussed above. For example, the modification component 824B and/or the modification circuit 827 may thicken the edge(s) depicted in the edge map(s) by a varying amount depending on the number of optimization iterations that have been completed and/or based on the current stage of the wireframe generation operation.

The loss component 824C and/or the loss circuit 828 (which may correspond to the loss component 130 of FIG. 1) may be used to compute losses (e.g., the loss 165 of FIG. 1) used to refine the Gaussian distributions, as discussed above. For example, the loss component 824C and/or the loss circuit 828 may generate losses based on comparing the (modified) edge maps and images rendered to depict the Gaussians in 3D space in order to generate the loss(es) for each iteration.

The initialization component 824D and/or the initialization circuit 829 (which may correspond to the initialization component 135 of FIG. 1) may be used to initialize the set of Gaussian distributions (e.g., to generate the initial point cloud 140 of FIG. 1), as discussed above. For example, the initialization component 824D and/or the initialization circuit 829 may generate the initial set of Gaussians to be within the volume of the detected object(s) and/or near the detected edge(s), accelerating the wireframe generation process.

The splatting component 824E and/or the splatting circuit 830 (which may correspond to the Gaussian splatting component 145 of FIG. 1) may be used to perform Gaussian splatting, as discussed above. For example, the splatting component 824E and/or the splatting circuit 830 may iteratively refine the parameters of the Gaussian(s) (e.g., to generate the Gaussians 150 of FIG. 1) based on the loss(es) to generate accurate wireframes.

The alignment component 824F and/or the alignment circuit 831 (which may correspond to the alignment component 175 of FIG. 1) may be used to align the set of Gaussians periodically (e.g., every N iterations) to generate aligned Gaussians (e.g., the aligned Gaussians 180 of FIG. 1), as discussed above. For example, the alignment component 824F and/or the alignment circuit 831 may move each Gaussian center to a local principal axis to align the Gaussians along the edges.

The rendering component 824G and/or the rendering circuit 832 (which may correspond to the rendering component 155 of FIG. 1) may be used to render images of the Gaussian distributions (e.g., to generate the rendered images 160 of FIG. 1), as discussed above. For example, the rendering component 824G and/or the rendering circuit 832 may generate the rendered images depicting the Gaussians to allow for efficient computation of the loss terms.

Though depicted as separate components and circuits for clarity in FIG. 8, the edge circuit 826, the modification circuit 827, the loss circuit 828, the initialization circuit 829, the splatting circuit 830, the alignment circuit 831, and the rendering circuit 832 may collectively or individually be implemented in other processing devices of the processing system 800, such as within the CPU 802, the GPU 804, the DSP 806, the NPU 808, and the like.

Generally, the processing system 800 and/or components thereof may be configured to perform the methods described herein.

Notably, in other aspects, aspects of the processing system 800 may be omitted, such as where the processing system 800 is a server computer or the like. For example, the multimedia component 810, the wireless connectivity component 812, the sensor processing units 816, the ISPs 818, and/or the navigation processor 820 may be omitted in other aspects. Further, aspects of the processing system 800 maybe distributed between multiple devices.

Example Clauses

Implementation examples are described in the following numbered clauses:

Clause 1: A method, comprising: accessing an image depicting an object; generating an edge map comprising a plurality of edges based on the image; modifying a thickness of each of the plurality of edges in the edge map based on a current stage of the three-dimensional reconstruction; generating a rendered image depicting a set of Gaussian distributions in a three-dimensional virtual space using Gaussian splatting; modifying one or more parameters of one or more of the set of Gaussian distributions based on comparing the rendered image and the edge map; and after modifying the one or more parameters, generating a three-dimensional wireframe model of the object based on the set of Gaussian distributions.

Clause 2: A method according to Clause 1, wherein modifying the thickness of each of the plurality of edges based on the current stage of the three-dimensional reconstruction comprises increasing the thickness of each of the plurality of edges by a first amount, wherein the first amount is less than an amount used to increase edge thickness during a prior stage of the three-dimensional reconstruction, relative to the current stage.

Clause 3: A method according to any of Clauses 1-2, wherein modifying the thickness of each of the plurality of edges comprises: generating a set of distance values for a set of pixels in the edge map using a distance transform; and binarizing the set of distance values based on a threshold value, wherein the threshold value controls the thickness of each of the plurality of edges.

Clause 4: A method according to any of Clauses 1-3, wherein modifying the thickness of each of the plurality of edges comprises applying a Gaussian blur operation to the edge map.

Clause 5: A method according to any of Clauses 1-4, further comprising initializing the set of Gaussian distributions based on a set of initialization edge maps corresponding to the object, comprising: back projecting a set of pixels corresponding to edges in the set of initialization edge maps into the three-dimensional virtual space; and initializing the set of Gaussian distributions based on the back projected set of pixels.

Clause 6: A method according to Clause 5, wherein initializing the set of Gaussian distributions based on the back projected set of pixels comprises: identifying a set of voxels in the three-dimensional virtual space that were intersected by the back projecting; and randomly distributing the set of Gaussian distributions within the identified set of voxels.

Clause 7: A method according to any of Clauses 1-6, further comprising aligning the set of Gaussian distributions comprising, for a first Gaussian distribution of the set of Gaussian distributions: identifying a set of nearest neighbors to the first Gaussian distribution; generating a local covariance matrix for the first Gaussian distribution based on the set of nearest neighbors; determining a principal axis of the set of nearest neighbors based on the local covariance matrix; and moving the first Gaussian distribution, in the three-dimensional virtual space, to the principal axis.

Clause 8: A method according to any of Clauses 1-7, wherein generating the three-dimensional wireframe model comprises determining a set of edge orientations for the three-dimensional wireframe model based on the set of Gaussian distributions.

Clause 9: A method according to Clause 8, wherein determining the set of edge orientations comprises, for a first Gaussian distribution of the set of Gaussian distributions: identifying a set of nearest neighbors to the first Gaussian distribution; generating a local covariance matrix for the first Gaussian distribution based on the set of nearest neighbors; and determining a principal axis of the set of nearest neighbors based on the local covariance matrix, wherein at least one of the set of edge orientations corresponds to the principal axis.

Clause 10: A method according to Clause 8, wherein determining the set of edge orientations comprises, for a first Gaussian distribution of the set of Gaussian distributions, constraining a scale of the first Gaussian distribution during the three-dimensional reconstruction to be elongated along a primary axis, wherein at least one of the set of edge orientations corresponds to the primary axis.

Clause 11: A processing system comprising: one or more memories comprising processor-executable instructions; and one or more processors coupled to the one or more memories and configured to execute the processor-executable instructions and cause the processing system to perform a method in accordance with any of Clauses 1-10.

Clause 12: A processing system comprising means for performing a method in accordance with any of Clauses 1-10.

Clause 13: A non-transitory computer-readable medium comprising computer-executable instructions that, when executed by one or more processors of a processing system, cause the processing system to perform a method in accordance with any of Clauses 1-10.

Clause 14: A computer program product embodied on a computer-readable storage medium comprising code for performing a method in accordance with any of Clauses 1-10.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:

one or more memories comprising processor-executable instructions; and one or more processors coupled to the one or more memories and configured to execute the processor-executable instructions and cause the processing system to:

access an image depicting an object;

generate an edge map comprising a plurality of edges based on the image;

modify a thickness of each of the plurality of edges in the edge map based on a current stage of a three-dimensional reconstruction operation;

generate a rendered image depicting a set of Gaussian distributions in a three-dimensional virtual space using Gaussian splatting;

modify one or more parameters of one or more of the set of Gaussian distributions based on comparing the rendered image and the edge map; and after modifying the one or more parameters, generate a three-dimensional wireframe model of the object based on the set of Gaussian distributions.

2. The processing system of claim 1, wherein:

to modify the thickness of each of the plurality of edges based on the current stage of the three-dimensional reconstruction operation, the one or more processors are configured to execute the processor-executable instructions and cause the processing system to increase the thickness of each of the plurality of edges by a first amount; and the first amount is less than an amount used to increase edge thickness during a prior stage of the three-dimensional reconstruction operation, relative to the current stage.

3. The processing system of claim 1, wherein, to modify the thickness of each of the plurality of edges, the one or more processors are configured to execute the processor-executable instructions and cause the processing system to:

generate a set of distance values for a set of pixels in the edge map using a distance transform; and binarize the set of distance values based on a threshold value, wherein the threshold value controls the thickness of each of the plurality of edges.

4. The processing system of claim 1, wherein, to modify the thickness of each of the plurality of edges, the one or more processors are configured to execute the processor-executable instructions and cause the processing system to apply a Gaussian blur operation to the edge map.

5. The processing system of claim 1, wherein:

the one or more processors are configured to further execute the processor-executable instructions and cause the processing system to initialize the set of Gaussian distributions based on a set of initialization edge maps corresponding to the object; and to initialize the set of Gaussian distributions, the one or more processors are configured to execute the processor-executable instructions and cause the processing system to:

back project a set of pixels corresponding to edges in the set of initialization edge maps into the three-dimensional virtual space; and initialize the set of Gaussian distributions based on the back projected set of pixels.

6. The processing system of claim 5, wherein, to initialize the set of Gaussian distributions based on the back projected set of pixels, the one or more processors are configured to execute the processor-executable instructions and cause the processing system to:

identify a set of voxels in the three-dimensional virtual space that were intersected by the back projecting; and randomly distribute the set of Gaussian distributions within the identified set of voxels.

7. The processing system of claim 1, wherein the one or more processors are configured to further execute the processor-executable instructions and cause the processing system to align the set of Gaussian distributions, wherein, to align the set of Gaussian distributions, the one or more processors are configured to execute the processor-executable instructions and cause the processing system to, for a first Gaussian distribution of the set of Gaussian distributions:

identify a set of nearest neighbors to the first Gaussian distribution;

generate a local covariance matrix for the first Gaussian distribution based on the set of nearest neighbors;

determine a principal axis of the set of nearest neighbors based on the local covariance matrix; and move the first Gaussian distribution, in the three-dimensional virtual space, to the principal axis.

8. The processing system of claim 1, wherein, to generate the three-dimensional wireframe model, the one or more processors are configured to execute the processor-executable instructions and cause the processing system to determine a set of edge orientations for the three-dimensional wireframe model based on the set of Gaussian distributions.

9. The processing system of claim 8, wherein, to determine the set of edge orientations, the one or more processors are configured to execute the processor-executable instructions and cause the processing system to, for a first Gaussian distribution of the set of Gaussian distributions:

identify a set of nearest neighbors to the first Gaussian distribution;

generate a local covariance matrix for the first Gaussian distribution based on the set of nearest neighbors; and determine a principal axis of the set of nearest neighbors based on the local covariance matrix, wherein at least one of the set of edge orientations corresponds to the principal axis.

10. The processing system of claim 8, wherein:

to determine the set of edge orientations, the one or more processors are configured to execute the processor-executable instructions and cause the processing system to, for a first Gaussian distribution of the set of Gaussian distributions, constrain a scale of the first Gaussian distribution during the three-dimensional reconstruction operation to be elongated along a primary axis; and at least one of the set of edge orientations corresponds to the primary axis.

11. A processor-implemented method for three-dimensional reconstruction using machine learning, comprising:

accessing an image depicting an object;

generating an edge map comprising a plurality of edges based on the image;

modifying a thickness of each of the plurality of edges in the edge map based on a current stage of the three-dimensional reconstruction;

generating a rendered image depicting a set of Gaussian distributions in a three-dimensional virtual space using Gaussian splatting;

modifying one or more parameters of one or more of the set of Gaussian distributions based on comparing the rendered image and the edge map; and after modifying the one or more parameters, generating a three-dimensional wireframe model of the object based on the set of Gaussian distributions.

12. The method of claim 11, wherein modifying the thickness of each of the plurality of edges based on the current stage of the three-dimensional reconstruction comprises increasing the thickness of each of the plurality of edges by a first amount, wherein the first amount is less than an amount used to increase edge thickness during a prior stage of the three-dimensional reconstruction, relative to the current stage.

13. The method of claim 11, wherein modifying the thickness of each of the plurality of edges comprises:

generating a set of distance values for a set of pixels in the edge map using a distance transform; and binarizing the set of distance values based on a threshold value, wherein the threshold value controls the thickness of each of the plurality of edges.

14. The method of claim 11, wherein modifying the thickness of each of the plurality of edges comprises applying a Gaussian blur operation to the edge map.

15. The method of claim 11, further comprising initializing the set of Gaussian distributions based on a set of initialization edge maps corresponding to the object, comprising:

back projecting a set of pixels corresponding to edges in the set of initialization edge maps into the three-dimensional virtual space; and initializing the set of Gaussian distributions based on the back projected set of pixels.

16. The method of claim 15, wherein initializing the set of Gaussian distributions based on the back projected set of pixels comprises:

identifying a set of voxels in the three-dimensional virtual space that were intersected by the back projecting; and randomly distributing the set of Gaussian distributions within the identified set of voxels.

17. The method of claim 11, further comprising aligning the set of Gaussian distributions comprising, for a first Gaussian distribution of the set of Gaussian distributions:

identifying a set of nearest neighbors to the first Gaussian distribution;

generating a local covariance matrix for the first Gaussian distribution based on the set of nearest neighbors;

determining a principal axis of the set of nearest neighbors based on the local covariance matrix; and moving the first Gaussian distribution, in the three-dimensional virtual space, to the principal axis.

18. The method of claim 11, wherein generating the three-dimensional wireframe model comprises determining a set of edge orientations for the three-dimensional wireframe model based on the set of Gaussian distributions.

19. The method of claim 18, wherein determining the set of edge orientations comprises, for a first Gaussian distribution of the set of Gaussian distributions, constraining a scale of the first Gaussian distribution during the three-dimensional reconstruction to be elongated along a primary axis, wherein at least one of the set of edge orientations corresponds to the primary axis.

20. An apparatus comprising:

means for accessing an image depicting an object;

means for generating an edge map comprising a plurality of edges based on the image;

means for modifying a thickness of each of the plurality of edges in the edge map based on a current stage of a three-dimensional reconstruction operation;

means for generating a rendered image depicting a set of Gaussian distributions in a three-dimensional virtual space using Gaussian splatting;

means for modifying one or more parameters of one or more of the set of Gaussian distributions based on comparing the rendered image and the edge map; and means for generating, after modifying the one or more parameters, a three-dimensional wireframe model of the object based on the set of Gaussian distributions.

* * * * *